United States Patent [19]

Pannbacker

[11] Patent Number: 5,136,511
[45] Date of Patent: Aug. 4, 1992

[54] SAFETY CIRCUIT

[75] Inventor: Helmut Pannbacker, Hemmingen, Fed. Rep. of Germany

[73] Assignee: WABCO Westinghouse Fahrzeugbremsen GmbH, Hanover, Fed. Rep. of Germany

[21] Appl. No.: 468,126

[22] Filed: Jan. 22, 1990

[30] Foreign Application Priority Data

Jan. 21, 1989 [DE] Fed. Rep. of Germany ....... 3901776

[51] Int. Cl.$^5$ .............................................. B60T 8/32
[52] U.S. Cl. ............................ 364/426.02; 303/100; 303/111
[58] Field of Search ............... 364/426.02, 565; 303/100, 111

[56] References Cited

U.S. PATENT DOCUMENTS

| | | | |
|---|---|---|---|
| 4,005,911 | 2/1977 | Klatt et al. | 303/111 |
| 4,652,060 | 3/1987 | Miyake | 303/111 |
| 4,718,013 | 1/1988 | Kubo | 364/565 |
| 4,729,608 | 3/1988 | Fennel et al. | 364/426.02 |
| 4,762,376 | 8/1988 | Matsubara | 303/111 |
| 4,844,557 | 7/1989 | Giers | 303/111 |
| 4,933,854 | 6/1990 | Miyake | 303/111 |

Primary Examiner—Salvatore Cangialosi
Attorney, Agent, or Firm—Horst M. Kasper

[57] ABSTRACT

A safety circuit (12) for the surveillance of the proper functioning of an electronic wheel lockup-protected motor vehicle brake system includes automatic control circuits (10, 38), automatically controlled magnet valves (4, 46), and pick-up transducers (3, 47) at the motor vehicle wheels (2, 48) to be monitored. An error message and/or a partial shut-off of a defective pair of circuits, relating to wheel lockup protection circuits relating to diagonally disposed wheels, occurs in this safety circuit when an upward jump or a downward jump is recognized in the measured velocity of the one wheel and, simultaneously, the speed of the diagonally, oppositely disposed wheel or of any other wheel is measured to be above a limiting value. It is thereby avoided that an undesired error message occurs already when a jump in velocity is recognized, for instance in case of a standing vehicle, in case of a starting of the motor, or in case of a beginning of rolling of the vehicle.

23 Claims, 2 Drawing Sheets

SAFETY CIRCUIT

BACKGROUND OF THE INVENTION

1. Field of the Invention

The invention relates to a safety circuit for surveillance of a wheel lockup-protected motor vehicle brake system.

2. Brief Description of the Background of the Invention Including Prior Art

The output values of pick-up transducers, disposed at motor vehicle wheels to be controlled, are fed to an automatic control electronic in a wheel lockup-protected motor vehicle brake systems. The pick-up transducers, in general furnish voltage signals, where the frequency of the voltage signals is proportionate to the speed of the motor vehicle. In this case, the pick-up transducers form in general a magnetic field, which is influenced by a toothed magnet wheel passing by at a small distance. The toothed magnet wheel induces a voltage in the coil of the pick-up transducer.

The pick-up transducers are disposed at the wheels of the motor vehicle and thus are subjected to substantial loads based on vibrations, jolts, and shocks of the motor vehicle and are further subject to soiling, which can substantially influence the signal generation.

It is thereby possible that voltage signals are generated, which do not correspond to the actual speed of the motor vehicle wheel. Since such defective capturing or recording of the speed of the motor vehicle wheel can lead to dangerous situations during application of a braking control, safety and surveillance or monitoring circuits are generally provided which, upon occurrence of such errors in the wheel lockup-protected brake system, recognize and signal these errors and, if necessary, switch off the defective subpart regions of the wheel lockup-protected brake system, such that the brake system then operates only like a conventional brake system.

A safety circuit is known from the printed flyer "WABCO-Anti-Blockier-System, Erhohte Sicherheit durch Diagonal-Aufteilung," (WABCO Antilock System, Increased Safety by Diagonal Partitioning), Edition Aug. 1983, Publisher WABCO Westinghouse Fahrzeugbremsen GmbH, Hanover. This safety circuit controls the pick-up transducers and the respective cabling or cable circuits upon the start of driving and during the driving. Said safety circuit signals the occurring errors to the driver and switches off simultaneously the defective part of the system in a diagonal fashion. In this case, only the part of the automatic control electronic for two diagonally, oppositely disposed motor vehicle wheels of different motor vehicle axles is switched off.

It is conceivable in the context of an antilock system with such a safety circuit that, upon starting up of a large commercial vehicle or upon shifting of gears or of shifting into gear, upon loading or other vibrations, there will occur a short-term wheel motion of individual motor vehicle wheels, which motion is evaluated by the control electronics as a jump in velocity. Since such jumps in velocity can be interpreted as sudden, disproportionately large speed changes, which cannot occur during normal driving conditions or usual motor vehicle operation, the safety circuit evaluates this as error of the wheel lockup-protected brake system and therefore switches off the wheel lockup-protected brake system. Thus, only the conventional brake system remains in operation which however, offers less driving safety versus the wheel lockup-protected brake system. Since, however, such vibration-caused interferences do not represent a proper error of the brake system, it is disadvantageous if the wheel lockup-protected brake system is switched off in such cases.

SUMMARY OF THE INVENTION

1. Purposes of the Invention

It is an object of the present invention to further develop a safety circuit of the initially recited kind and to improve such safety circuit such that improper error recognition and acceptance is substantially prevented by the safety circuit.

It is a further object of the present invention to provide an antilock brake system for commercial vehicles which can be easily constructed while providing an optimally high level of reliability.

It is yet a further object of the present invention to control and to compensate possible errors generated in an automatic antilock brake system.

These and other objects and advantages of the present invention will become evident from the description which follows.

2. Brief Description of the Invention

The present invention provides a safety circuit for monitoring of the functioning of an electronic wheel lockup-protected motor vehicle brake system. An electronic system furnishes an error signal and/or a partial shut-off of electronic circuitry in a case where a jump in a velocity signal of one wheel is recognized as an erroneous signal and where simultaneously the velocity of the diagonally, oppositely disposed wheel or of another wheel is found to be at a value higher than a predetermined limiting value.

The electronic system can comprise a first wheel. A first automatic control circuit can have an input derived from monitoring the speed of the first wheel and having an output. A first circuit part can have an input connected to the output of the first automatic control circuit. A first jump-recognition circuit of the first circuit part can be provided for detecting an upward jump in velocity and a second jump-recognition circuit of the first circuit can be provided for detecting a downward jump in velocity. There can further be provided a first comparison circuit for monitoring the speed of the first wheel and an output of the first circuit part. A second automatic control circuit can have an input derived from monitoring the speed of the second wheel and having an output. A second circuit part can have an input connected to the output of the second automatic control circuit. The second circuit part can include a first jump-recognition circuit of the a second circuit part for detecting an upward jump in velocity as well as a second jump-recognition circuit of the second circuit for detecting a downward jump in velocity. There is further included a second comparison circuit for monitoring the speed of the second wheel, and an output of the second circuit part. The first circuit part and the second circuit part can form a safety circuit. A logic circuit can have a first input connected to the output of the first circuit part and can have a second input connected to the output of the second circuit part for providing a joining of the first circuit part and of the second circuit part.

The first jump recognition circuit of the first circuit part can have an output forming part of the output of the first circuit part. The second jump recognition circuit of the first circuit part can have an output forming part of the output of the first circuit part. The first comparison circuit of the first circuit part can have an output forming part of the output of the first circuit part. The first jump recognition circuit of the second circuit part can have an output forming part of the output of the first circuit part. The second jump recognition circuit of the second circuit part can have an output forming part of the output of the first circuit part. The second comparison circuit of the first circuit part can have an output forming part of the output of the first circuit part. The logic circuit can comprise four AND gates. Each AND gate can include two inputs. Said two inputs can be connected to respective outputs of the jump-recognition circuits and to the respective outputs of the comparison circuits. In this way, the outputs of the jump-recognition circuits and the outputs of the comparison circuits can be connected to the inputs of an OR gate.

The jump recognition circuits can be activated when there occurs an upward jump in velocity from about zero to more than a lower limit speed and when a wheel speed limit is set to a lower limit speed. The jump recognition circuits can also be activated when there occurs a downward jump in velocity of more than an upper limit speed down to about zero, and when a wheel speed limit is set to a lower speed limit.

The safety circuit can include a microprocessor or an integrated circuit. The logic circuit can have a signal output and can further comprise a storage and amplifier circuit having an input connected to the output of the logic circuit and having an output. A signal device can have an input connected to the output of the storage and amplifier circuit. The storage and amplifier circuit can activate the signal device furnished for a respective diagonal system associated with two diagonally disposed wheels. The signal device can be a lamp or a shut-off relay.

A monitoring method for assuring a proper functioning of an electronic wheel lockup-protected motor vehicle brake system comprises the following steps. A jump in a velocity signal of a first wheel is monitored. The velocity of a second wheel is monitored. The jump in the velocity signal of the first wheel is recognized as an erroneous signal in a safety circuit. An an error signal is generated, where a jump in the velocity signal of one wheel is recognized as an erroneous signal and where simultaneously the velocity of the diagonally, oppositely disposed wheel or of another wheel is found to be at a higher value than a predetermined limiting value. The second wheel can be disposed diagonally oppositely to the first wheel.

The electronic circuitry can be partially shut off in a case where a jump in the velocity signal of one wheel is recognized as an erroneous signal.

An upward jump can be detected in a first wheel velocity in a first jump-recognition circuit. A downward jump can be detected in a first wheel velocity in a second jump-recognition circuit. A wheel speed limit can be monitored in a comparison circuit. The detecting results and the monitoring results can be compared with those of another wheel in a logic circuit.

A signal output of the logic circuit can be amplified in an amplifier circuit. A signal device can be triggered with an output signal of the amplifier circuit for a respective diagonal formed by two wheels.

Jump recognition circuits can be activated when there occurs an upward jump in velocity from about zero to a lower limit value, or when there occurs a downward jump in velocity of more than an upper limit value down to about zero, and when a wheel speed limit is set to the lower limit value.

The invention is associated with the advantage that the safety of a motor vehicle with a wheel lockup-protected brake system is improved by employing comparatively little additional equipment means. Thus, the safety circuit according to the invention can be realized by an electronic circuit as an integral part of the automatic control circuit of the wheel lockup-protected brake system. In addition to the electronic circuit, no constructive additional requirements or expenditure exist for the incorporation of the safety circuit according to the invention into a vehicle.

If the electronics of the wheel lockup-protected brake system comprises a microprocessor, the safety circuit according to the invention can be fully realized based on software, without requiring hardware-based additions.

The safety circuit according to the invention is further associated with the advantage that it monitors or signals only those jumps in velocity as detection errors which do not actually represent a jump in velocity of the motor vehicle. Thus, the safety circuit takes also into consideration the circumstance that a jump in velocity cannot occur in a standing vehicle. The safety circuit therefore tests and checks before each error message, if the vehicle has surpassed a certain speed or not. It is irrelevant in this context if the jump in velocity occurs from a standing position (upward jump in velocity) or if the vehicle passes from a certain speed to a rest position (downward jump in velocity).

This is achieved by the safety circuit of the invention by employing a kind of plausibility test. This test can recognize in case of certain operating conditions if, in fact, a defect is present at one of the pick-up transducers or if only a unimportant, short-term disturbance is present. Thus the invention starts from the recognition that, for example, a failure of a pick-up transducer can only be present when one of the other pick-up transducers also delivers a velocity signal. Otherwise, it can also be that the vehicle is still in a standing position. However, in case of a standing vehicle, a switching off of the wheel lockup-protected brake system is not called for. Therefore, the safety circuit is in a position to recognize real errors at one of the pick-up transducers or at other tested and/or checked device elements of the wheel lockup-protected brake system and to switch off only then the wheel lockup protection. Said wheel lockup protection is very important from a safety technical point of view.

According to a particular embodiment of the invention, the rotation speed of the monitored motor vehicle wheel of one motor vehicle axle is compared with the rotation speed of the diagonally, oppositely disposed motor vehicle wheel on the other axle and, in case of an error recognition, only this diagonal branch is switched off. This procedure is associated with the advantage that the wheel lockup-protected brake system can still function for the second diagonal branch of wheels and that a possible instability of the motor vehicle, based on locking wheels, is thereby prevented.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawings

DESCRIPTION OF INVENTION AND PREFERRED EMBODIMENT

Figure 1:
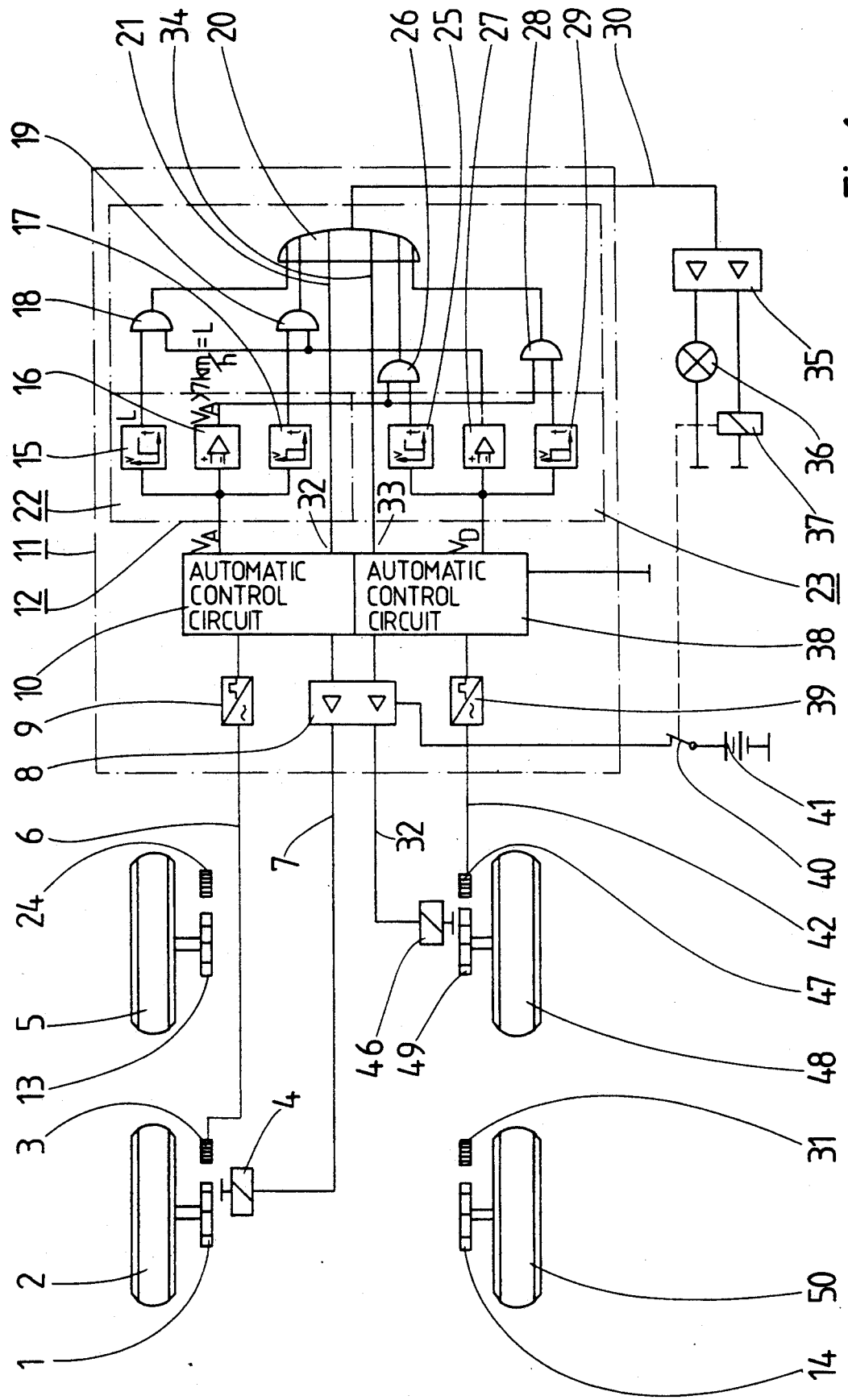
FIG. 1 is a block circuit diagram of a wheel lockup-protected brake system with safety circuit for two automatic control channels.
Figure 2:
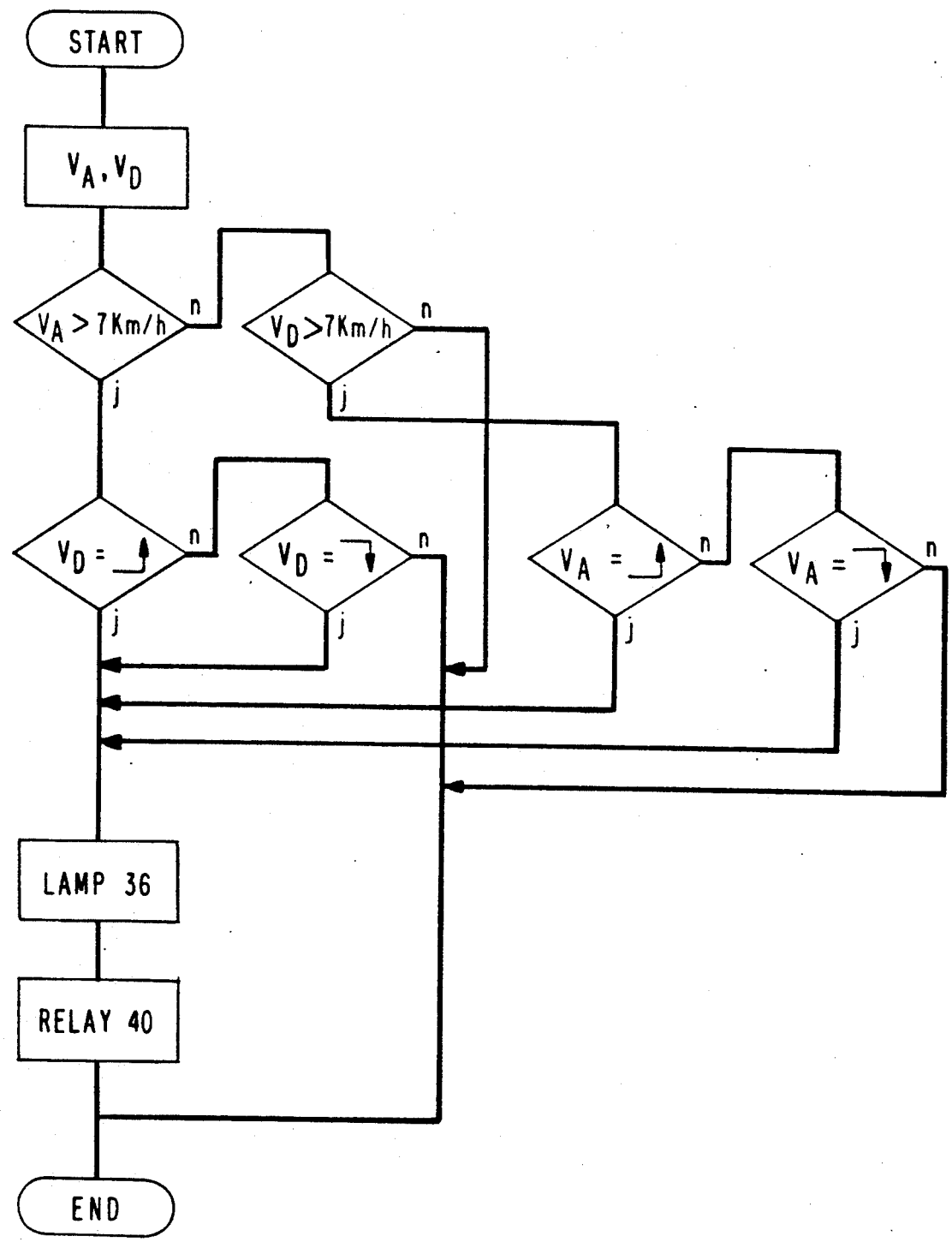
FIG. 2 is a flow chart of the operation of the safety circuit.

According to the present invention, there is provided a safety circuit 12 for monitoring a proper functioning of an electronic wheel lockup-protected motor vehicle brake system. An error signal and/or a partial shut-off of electronic circuitry occurs in case where a jump in velocity signal of one wheel is recognized as an erroneous signal and where simultaneously the velocity of the diagonally, oppositely disposed wheel or of another wheel is found to be at a higher value than a predetermined limiting value.

The safety circuit 12 can comprise two circuit parts 22, 23. In this case, each part can be coordinated to a respective automatic control circuit 10, 38. Said circuit parts 22, 23 of the safety circuit 12 can comprise, in each case, a first jump-recognition circuit 15, 25 for detecting an upward jump in velocity, a second jump-recognition circuit 17, 29 for detecting a downward jump in velocity, and a comparison circuit 16, 27 for monitoring of a wheel speed limit. Said two circuit parts 22, 23 can be connected to each other via a successively disposed logic circuit 18, 19, 26, 28.

The logic circuit can comprise four AND gates 18, 19, 26, 28. Said AND gates, in each case, can include two inputs. Said two inputs can be connected to the outputs of the jump-recognition circuits 15, 17, 25, 29 and to the outputs of the comparison circuits 16, 27. The outputs of the jump-recognition circuits 15, 17, 25, 29 and the outputs of the comparison circuits 16, 27 can be connected to the inputs of an OR gate 20.

The jump recognition circuits 15, 25, 17, 29 can be activated when there occurs either an upward jump in velocity from about zero to $\pm 7$ km/hour or a downward jump in velocity of more than 11.2 km/hour down to about zero, and when a wheel speed limit is set to 7 km/hour.

The safety circuit 12 can include a microprocessor or an integrated circuit. The signal output 30 of the safety circuit 12 can be connected to a storage and amplifier circuit 35. Said storage and amplifier circuit 35 can trigger a signal device such as a lamp 36 and/or a shut-off relay 37, 40 for a respective diagonal formed by two wheels.

Four monitored vehicle wheels of a motor vehicle are illustrated in FIG. 1. In each case, two diagonally, oppositely disposed vehicle wheels are coordinated to an automatic control electronic having a joint safety circuit. The automatic control electronic coordinated to the other two diagonally, oppositely disposed vehicle wheels with its corresponding safety circuit is not illustrated separately because its construction is identical to that of the illustrated automatic control electronic.

The motor vehicle wheels 2, 5, 48, 50 are, in each case, solidly and/or fixedly connected to a field spider or toothed magnet wheel 1, 13, 14, 49. The toothed magnet wheels operate at the same rotation speed as the vehicle wheels such that their circumferential velocity is proportional to the wheel velocity. The toothed magnet wheels can also be disposed at the drive or bearing shafts. The toothed magnet wheels are constructed as is done conventionally, where tooth-shaped segments, made of a ferromagnetic material, are disposed at the circumference of the toothed magnet wheel. In each case, a pick-up transducer 3, 47, 24, 31 is attached opposite to the toothed magnet wheels. The pick-up transducer in general comprises a bar magnet and a coil where, in case of a rotating toothed magnet wheel, an electric voltage is induced in the coil. The frequency of the electric voltage induced corresponds to the speed of the respectively rotating wheel and therefore of the motor vehicle.

An electric pick-up transducer conduit 6 runs from the pick-up transducer 3 to the automatic control electronic 11. The pick-up transducer conduit 6 is led in the automatic control electronic 11 to a signal preparation circuit 9. Said signal preparation circuit 9 analyses and separates features of the voltage signals, generated by the pick-up transducer 3, relative to interference signals or unwanted signals. The signal preparation circuit 9 performs further a signal preparation by transforming the generated voltage signals into a square-wave-shaped voltage of constant amplitude, where the frequency of the square-wave-shaped voltage of constant amplitude corresponds to the wheel velocity.

The thus prepared analog voltage signals are fed to the automatic control circuit 10, preferably formed by a microcomputer. The automatic control circuit 10 determines a digital wheel velocity signal from the prepared analog voltage signals about every 4 milliseconds, corresponding to the programmed rotation time. The automatic control electronic 11 thus has available as many substantially alike automatic control circuits 10, 38 as there are motor vehicle wheels present corresponding to the pick-up transducers 3, 47. In each case, two automatic control circuits 10, 38 form a unit which is coordinated, in each case, to two diagonally, oppositely disposed wheels. The unit is monitored by a joint safety circuit 12.

Since the invention refers to a safety circuit, which primarily has the function to perform a surveillance and monitoring of the pick-up transducers 3, 47 and its pick-up transducer conduits 6, 42, the drawing illustrates only that part of the safety circuit which refers to this surveillance part. In addition, the automatic control circuits 10, 38 also comprise circuit parts, which survey and monitor the automatically controlled magnet valves 4, 46 and other circuit parts o the wheel lockup-protected brake system. Error lines applying on signal connection lines 21, are associated to this surveying and monitoring, which signal connection lines are connected to the input of an OR gate 20.

The safety circuit 12 comprises essentially two substantially alike circuit parts 22, 23, wherein each part is coordinated to an automatic control circuit 10, 38. The two circuit parts 22, 23 are connected to each other via a logic circuit 18, 19, 20, 26, 28 and form a joint signal output 30. Said signal output 30 controls a signal device, such as a signal lamp 36, and a shut-off relay 37, 40 via an amplifier circuit 35.

The circuit part 22 of the safety circuit 12, which is coordinated to the automatic control circuit 10, comprises a first jump-recognition circuit 15, a first comparison circuit 16, and a second jump-recognition circuit 17, where the inputs are connected with an output $V_A$ of the automatic control circuit 10 and where, in this manner, the velocity signal at point $V_A$ is fed to the inputs of the second jump-recognition circuit 17 for the automatically controlled motor vehicle wheel 2.

The first jump-recognition circuit 15 serves for recognizing a jump in velocity which corresponds to a positive wheel acceleration. The jump-recognition circuit 15 comprises an input circuit, which is activated by a digital velocity signal, where the value of the digital velocity signal corresponds to an actual speed of zero kilometers per hour. If a velocity signal follows to such an activation signal, this velocity signal is compared with a signal which corresponds to a wheel velocity of 7 km/hour. If the velocity signal surpasses the value of the wheel velocity of 7 km/hour, then an error signal is formed as an output signal, which error signal is fed to the first AND gate 18.

The digital wheel velocity signal is simultaneously also fed to the first comparison circuit 16. The first comparison circuit 16 compares this signal with a threshold value, which threshold value corresponds to a speed of 7 km/hour. Thus, the first comparison circuit 16 generates an error signal as an output signal if the value of the velocity signal surpasses a value, which corresponds to a minimum speed of 7 km/hour. This output signal is then applied at one of the two inputs of a third AND gate 26 and at one of the two inputs of a fourth AND gate 28.

The velocity signal, which is coordinated to the motor vehicle wheel 2, also applies at the second jump-recognition circuit 17 In this case, a circuit is present, which recognizes a downward jump in velocity of more than 11.2 km/hour to a value of approximately 0 km/hour or to a minimum speed determined for the respective motor vehicle.

The jump-recognition circuits 15, 17 comprise a storage circuit which is initiated and triggered in the rhythm of the velocity capturing. The automatic control electronic 11 captures at a time time spacing of approximately 4 milliseconds the respective wheel velocity and applies this velocity signal at the input of the jump-recognition circuits 15, 17, and of the comparison circuit 16. The second jump-recognition circuit 17 stores the input value in each case in the rhythm of the velocity capturing of about 4 milliseconds and also delivers the previous value as output and simultaneously eliminates the value of a previous cycle. In this context, an output signal is generated only if the value of the preceding filtered velocity captured corresponded to a value of more than 11.2 km/hour and if the present unfiltered value exhibits a speed of about 0 km/hour. The output signal of the second jump-recognition circuit 17 represents also an error signal and is applied at the second AND gate 19.

Similarly, the safety circuit 12 comprises in its second circuit part 23 a third jump-recognition circuit 25, a second comparison circuit 27, and a fourth jump-recognition circuit 29, which are coordinated to the automatic control channel 38 and which monitor the pick-up transducer 47 of the motor vehicle wheel 48. In this context, the first and the third jump-recognition circuits 15, 25 serve for determining an upward jump in velocity from 0 km/hour to at least 7 km/hour between two successive measurement cycles of a duration of about 4 milliseconds, respectively. The second and the fourth jump-recognition circuits 17, 29 in contrast serve for determining a downward jump in velocity of more than 11.2 km/hour to 0 km/hour. The motor vehicle wheel 48 also comprises a toothed magnet wheel 49, where the rotational speed is captured by the pick-up transducer and is fed via a signal preparation circuit 39 to the automatic control circuit 38. This automatic control circuit 38 similarly determines about every 4 milliseconds a digital velocity signal from the pick-up transducer signals, which velocity signal corresponds to the wheel speed of the captured motor vehicle wheel 48. The velocity signal $V_D$ is fed to the third jump-recognition circuit 25, the second comparison circuit 27, and to the fourth jump-recognition circuit 29. In this case, the output of the third jump-recognition circuit 25 is applied to the input of the third AND gate 26, the output of the second comparison circuit 27 is connected to and applied to the second AND gate 19, and the second input of the first AND gate 18 and the output of the fourth jump-recognition circuit 29 are connected and applied to the second input of the fourth AND gate 28. The outputs of the four AND gates 18, 19, 26. 28 are disposed at the inputs of an OR gate 20.

Furthermore, the input of the OR gate 20 is also connected to two signal outputs 32, 33 of the two automatic control circuits 10, 38. The two automatic control circuits 10, 38 are activated upon errors of other circuit parts.

The signal output 30 of the OR gate 20 is connected to an amplifier circuit 35 which controls a signal lamp 36. Simultaneously, the amplifier circuit 35 triggers also a shut-off relay 37. Said shut-off relay 37 switches off the voltage supply 41 of a final amplifier 8 for the two automatically controlled magnet valves 46 and 4 with a shut-off contact 40. The final amplifier 8 is connected to the automatically controlled magnet valves 4 46 via lines 7, 32.

The two other diagonally, oppositely disposed motor vehicle wheels 5, 50 are provided with corresponding toothed magnet wheels 13, 14 with pick-up transducers 24, 31, which are furnished with an automatic control electronic with a similar safety circuit, not illustrated.

The above-described safety circuit 12 operates as follows:

First, it is understood that the wheel lockup-protected brake system is fully operational and that the vehicle is in a standing position. In this case, the pick-up transducers 3, 24, 31, 47 do not deliver any voltage pulses such that the signal preparation circuits 9, 39 are not prepared to respond or to be addressed and the automatic control circuits 10, 38 will calculate in each case a velocity of 0 km/hour. Since the automatic control circuits 10, 38 scan once per rotation time, i.e. every 4 milliseconds, the individual wheel velocities, the automatic control circuits 10, 38 will determine a speed of 0 km/hour for each measurement cycle. Such a digital velocity signal is now applied simultaneously at the jump-recognition circuits 15, 17, 25, 29 and at the comparison circuits 16, 27. However, the jump-recognition circuits 15, 17, 25, 29 form only then an error signal as an output signal when the above-explained speed change occurs. Since this is not the case during the standing of the vehicle, no signal is present at at least one of the two inputs of all AND gates 18, 19, 26, 28.

The AND gates can therefore also not form an output signal which would be in a position to trigger the signal device, such as a signal lamp 36, and/or the shut-off relay 37 via the OR gate 20.

If the vehicle now starts to move slowly and reaches, for example, a speed of 30 km/hour, the pick-up transducers 3, 47 furnish voltage signals to the signal preparation circuit 9, 39, where the frequency of the voltage signals are proportional to the velocity of the wheel or, respectively, the motor vehicle. The signal preparation circuits 9, 39 form square-wave voltage signals from these voltage signals, where the frequency of the square-wave voltage signals corresponds to the frequency of the supplied signals. The automatic control circuits 10, 38 calculate from the square-wave voltage signals digital velocity signals, which digital velocity signals correspond to the wheel velocity of 30 km/hour. The velocity signals are, in each case, fed to the inputs of the jump-recognition circuits 15, 17, 25, 29 as well as to the comparison circuits 16, 27. During this acceleration operation, the automatic control circuits 10, 38 calculate an actual velocity signal about every 4 milliseconds. Since, even in case of maximum possible motor vehicle acceleration between the individual times of measurement, the velocity change can never surpass a value of 7 km/hour, the first jump-recognition circuit 15 and the third jump-recognition circuit 25 can also not form an error signal as an output signal. Thus, there is also no input signal present at the first AND gate 18 and at the third AND gate 26 at at least one of the two inputs, such that no output signal can be generated at these AND gates.

The second jump-recognition circuit 17 and the fourth jump-recognition circuit 29 as well deliver no output signal, since these can only form an output signal when the velocity signal between two times of measurement drops to a value of about 0 km/hour or less. In this context, the jump-recognition circuits 15, 17, 25, 29 represent a test, surveillance and/or monitoring circuit, which serves for the formation of error signals. Thus, no input signal is present at at least one input of the second AND gate 19 and at at least one input of the fourth AND gate 28 such that these AND gates do also not form an output signal. In this case, a triggering of the signal device, such as a signal lamp 36, and of the shut-off relay 37 is therefore also not possible even in case of a maximum acceleration of the vehicle.

Assuming that the pick-up transducer 3 of the motor vehicle wheel 2 delivers, based on soiling or larger air-gap changes, only sporadic voltage pulses to the automatic control circuit 10, then the automatic control circuit 10 starts to run for so long from a stand-still position of the wheel 2 as the pick-up transducer 3 does not deliver any voltage pulses of a level of at least 50 mV. As long as this is the case, the first jump-recognition circuit 15 is activated.

If the pick-up transducer 3 now suddenly delivers voltage pulses, which correspond to a speed of more than 7 km/hour, then the automatic control circuit 10 calculates from this the corresponding digital wheel velocity. Such a jump in velocity is however not possible in case of an actual motor vehicle acceleration, such that the first jump-recognition circuit 15 delivers an error signal as an output signal, which error signal is fed to the first AND gate 18 of the successively disposed logic circuit.

Simultaneously, the pick-up transducer 47 of the motor vehicle wheel 48, disposed diagonally opposite to the motor vehicle wheel 2, is also surveyed and monitored by the circuit part 23 of the safety circuit 12. In case of a rotating motor vehicle wheel, a digital velocity signal is formed in the corresponding automatic control circuit 38 of the automatic control electronic 11. Said digital velocity signal corresponds to the motor vehicle speed. Since the motor vehicle speed corresponds to a velocity of more than 7 km/hour, the second comparison circuit 27 forms an error signal as an output signal, which error signal output is connected to an input of the first AND gate 18. The output signals in this case correspond to the L signals of logic circuits. Since both the first jump-recognition circuit 15 as well as the second comparison circuit 27 apply an output signal to the first AND gate 18, the first AND gate 18 also forms an output signal, which output signal is applied to the OR gate 20. The OR gate 20 now forms therefrom in turn also an output signal, which triggers via the amplifier circuit 35 a signal device, such as a signal lamp 36, and simultaneously the shut-off relay 37. Said shut-off relay 37 shuts off via a shut-off or breaker contact 40 the final amplifier 8 for the automatically controlled magnet valve 4, 46. Thus, the wheel lockup protection for the wheels 2 and 48 is no longer in operation.

Sudden wheel motions can also occur in case of large commercial vehicles during starting of the motor, upon shifting of a gear or upon shifting into a gear or in case of other vibrations and shocks at individual motor vehicle wheels. If such a sudden wheel motion of the motor vehicle wheel 2 should have occurred, then the automatic control circuit 10 could calculate a sudden rise of the wheel velocity up to a value of more than 7 km/hour even though the motor vehicle is not yet moving. In such a case, the safety circuit 12 is not intended to shut off immediately the wheel lockup protection since no other errors or defects of the device are present which influence the functioning of the wheel lockup-protected brake system.

In case of such a velocity change from 0 to more than 7 km/hour, the first jump-recognition circuit 15 forms an error signal as an output signal. This output signal is then applied at the first input of the first AND gate 18. Since, in case of a non-moving motor vehicle, the pick-up transducer 47 at the motor vehicle wheel 48 does not deliver voltage signals, a velocity signal is also not applied at the second comparison circuit 27, such that also the second comparison circuit 27 does not generate an error signal as an output signal, which output signal would be applied at the first AND gate 18. Since, in this case, only the output signal of the first jump-recognition circuit 15 is applied at the first AND gate 18, the first AND gate 18 does also not form any output signal, such that neither the signal device, such as a signal lamp 36, nor the shut-off relay 37 are triggered or initiated and, thus, no switching-off of the wheel lockup-protected brake system occurs.

Similarly, as previously already described, the safety circuit also operates in cases where there occurs an apparent jump in velocity at one motor vehicle wheel, where the wheel velocity jumps suddenly from a velocity value of, for example, 20 km/hour to a value of about 0 km/hour. The safety circuit 12 always determines this case when the pick-up transducer of a motor vehicle wheel suddenly fails or, for other reasons such as, for example, upon a damage of the connection line, a velocity signal is no longer delivered. Since a motor vehicle wheel can reach such a brake delay in reality, the safety circuit 12 is to switch on the signal device, such as a signal lamp 36, and to shut off the wheel lockup protection. Otherwise, erroneous controls of the wheel lockup-protected brake system could occur, which could not be accepted based on safety reasons.

Assuming that the motor vehicle moves at a speed of, for example, 20 km/hour, and the automatic control circuit 10 of the motor vehicle wheel 2 no longer detects velocity signals because of a defect, then a velocity signal would be applied at the output of the automatic control circuit 10, which velocity signal would correspond to a speed of about 0 km/hour. If, in two successive measurement cycles, the filtered velocity of a motor vehicle wheel drops from a value of at least 11.2 km/hour to about 0 km/hour, the second jump-recognition circuit 17 determines a downward jump in velocity and delivers thereupon an error signal as an output signal to the input of the second AND gate 19.

Simultaneously, the motor vehicle wheel 48, disposed diagonally opposite to the motor vehicle wheel 2, delivers velocity pulses to the automatic control circuit 38. Said pulses correspond to a motor vehicle speed and thus also a wheel velocity of 20 km/hour. Since the automatic control circuit 38 is of the same construction as the automatic control circuit 10, a velocity signal $V_D$ applies at the output of the automatic control circuit 38, which velocity signal $V_D$ corresponds to a speed of 20 km/hour.

This velocity signal is also applied simultaneously at the input of the second comparison circuit 27, which comparison circuit then forms an error signal as output signal, which output signal is then also applied at the input of the second AND gate 19. Since an input signal is now applied at both inputs of the second AND gates 19, the second AND gate 19 forms an output signal, which output signal triggers via the OR gate 20 the signal device, such as a signal lamp 36, and the shut-off relay 37 and which thereby shuts off the wheel lockup protection of the wheels 2 and 48.

In case of a wheel lock-up protected motor vehicle brake system, it can also occur that a downward jump in velocity is determined based on shocks and vibrations of a standing vehicle. It is also to be prevented in such a case that this results in a shutting off of the wheel lockup protection.

Assuming that the second jump-recognition circuit 17 recognizes and determines a downward jump in velocity in case of a standing vehicle, then this second jump-recognition circuit forms an error signal at the output. Said error signal is applied simultaneously at the input of the second AND gate 19. Since in case of a standing vehicle the second comparison circuit 27 can also not deliver a drive signal as an output signal, no input signal is present at the second input of the second AND gate 19 such that this AND gate 19 does also not deliver an output signal, which can carry out, a triggering of the signal device, such as a signal lamp 36, and of the shut-off relay 37 via the OR gate 20.

In summary, an error signal occurs when an upward jump in velocity is recognized at one wheel and simultaneously, a motor vehicle speed of more than 7 km/hour is determined at a diagonally, oppositely disposed wheel or at another wheel.

An error indication can also occur based on other error recognitions. For example, the automatic control circuit 10 and the automatic control circuit 38 comprise other surveillance and monitoring circuits which can apply error signals to the signal connection lines 21, 34 and which can thus generate an output signal of the OR gate 20. Thereby, it can also come to the already above-described shut-offs of the automatically controlled magnet valves and to error indications.

The safety circuit 12 is, with respect to its two circuit parts 22, 23 coordinated to the individual control channels, of the same construction such that the functioning is the same, in case of jumps in velocity at the motor vehicle wheel 48, as described previously by way of example of the motor vehicle wheel 2. In this case, the modes of operation of the first and the second jump-recognition circuits 15, 17 correspond to those of the third and the fourth jump-recognition circuits 25, 29, as well those of the first comparison circuit 16 to those of the second comparison circuit 27. The mode of operation of the first and second AND gates 18, 19 corresponds also to the third and fourth AND gate 26, 28.

Furthermore, the wheel lockup-protected brake system for the motor vehicle wheels 5, 50 of the second diagonal is furnished with a further automatic control electronic with safety circuit, not illustrated. The further automatic control electronic with safety circuit corresponds to the previously described construction. Furthermore, the functioning of the safety circuit 12 can be realized by a corresponding programming of a microprocessor.

It will be understood that each of the elements described above, or two or more together, may also find a useful application in other types of safety circuits and speed and acceleration control system differing from the types described above.

While the invention has been illustrated and described as embodied in the context of a safety circuit for the surveillance and monitoring of a wheel lockup-protected motor vehicle brake system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A safety circuit for monitoring of the functioning of an electronic wheel lockup-protected motor vehicle brake system comprising
   an electronic system furnishing an error signal in a case where a jump in a velocity signal of one wheel is recognized as an erroneous signal and where simultaneously the velocity of the diagonally, oppositely disposed wheel is found to be at a value higher than a predetermined limiting value;
   wherein the electronic system comprises
   a first wheel;
   a first automatic locking control circuit having an input derived from monitoring the speed of the first wheel and having an output;
   a first circuit part having an input connected to the output of the first automatic locking control circuit and including a first jump-recognition circuit of a predetermined circuit part for detecting an upward jump in velocity, a second jump-recognition circuit of the predetermined circuit for detecting a downward jump in velocity, a first comparison circuit for monitoring the speed of the first wheel, and an output of the first circuit part;

a second wheel;

a second automatic locking control circuit having an input derived from monitoring the speed of the second wheel and having an output;

a second circuit part having an input connected to the output of the second automatic locking control circuit, wherein the second circuit part includes said first jump-recognition circuit of a predetermined circuit part for detecting an upward change in velocity, said second jump-recognition circuit of the predetermined circuit for detecting a downward jump in velocity, a second comparison circuit for monitoring the speed of the second wheel, and an output of the second circuit part, and a logic circuit having a first input connected to the output of the first circuit part and having a second input connected to the output of the second circuit part for providing a joining of the first circuit part and of the second circuit part to form a safety circuit.

2. The safety circuit according to claim 1,
wherein the first jump recognition circuit of the first circuit part has an output forming part of the output of the first circuit part;
wherein the second jump recognition circuit of the first circuit part has an output forming part of the output of the first circuit part;
wherein the firs comparison circuit of the first circuit part has an output forming part of the output of the first circuit part;
wherein the first jump recognition circuit of the second circuit part has an output forming part of the output of the first circuit part;
wherein the second jump recognition circuit of the second circuit part has an output forming part of the output of the first circuit part;
wherein the second comparison circuit of the first circuit part has an output forming part of the output of the first circuit part;
wherein the logic circuit comprises four AND gates wherein each AND gate includes two inputs, which two inputs are connected to respective outputs of the jump-recognition circuits and to the respective outputs of the comparison circuit, whereby the outputs of the jump-recognition circuits and the outputs of the comparison circuits are connected to the inputs of an OR gate.

3. The safety circuit according to claim 1, wherein
the jump recognition circuits are activated when there occurs an upward jump in velocity from about zero to more than a lower limit speed and when a wheel speed limit is set to a lower limit speed.

4. The safety circuit according to claim 1, wherein
the jump recognition circuits are activated when there occurs a downward jump in velocity of more than an upper limit speed down to about zero, and when a wheel speed limit is set to a lower speed limit.

5. The safety circuit according to claim 1, wherein the safety circuit includes a microprocessor.

6. The safety circuit according to claim 1, wherein the safety circuit includes an integrated circuit.

7. The safety circuit according to claim 1, wherein the logic circuit has a signal output and further comprising a storage and amplifier circuit having an input connected to the output of the logic circuit and having an output;

a signal device having an input connected to the output of the storage and amplifier circuit, wherein the storage and amplifier circuit activates the signal device furnished for a respective diagonal system associated with two diagonally disposed wheels.

8. The safety circuit according to claim 7, wherein the signal device is a lamp.

9. The safety circuit according to claim 7, wherein the signal device is a shut-off relay.

10. The safety circuit according to claim 1, further comprising a partial shut-off of electronic circuitry.

11. The safety circuit according to claim 1,
wherein the jump recognition circuits are activated when there occurs a downward jump in velocity of more than an upper limit speed down to about zero, and when a wheel speed limit is set to a lower speed limit;
wherein the safety circuit includes a microprocessor.

12. The safety circuit according to claim 1,
wherein the safety circuit includes a microprocessor;
wherein the safety circuit includes an integrated circuit;
wherein the logic circuit has a signal output and further comprising a storage and amplifier circuit having an input connected to the output of the logic circuit and having an output; a signal device having an input connected to the output of the storage and amplifier circuit, wherein the storage and amplifier circuit activates the signal device furnished for a respective diagonal system associated with two diagonally disposed wheels;

wherein the signal device is a lamp.

13. A safety circuit (12) for monitoring of a proper functioning of an electronic wheel lockup-protected motor vehicle brake system, wherein an error signal and a partial shut-off of electronic circuitry occurs in a case where a jump in velocity signal of one wheel is recognized as an erroneous signal and where simultaneously the velocity of the diagonally, oppositely disposed wheel or of another wheel is found to be at a higher value than a predetermined limiting value;

where the safety circuit (12) comprises two circuit parts (22, 23), where each part is coordinated to a respective automatic control circuit (10, 38), where the circuit parts (22, 23) of the safety circuit (12) comprise, in each case, a first jump-recognition circuit (15, 25) for detecting an upward jump in velocity, a second jump-recognition circuit (17, 29) for detecting a downward jump in velocity, and a comparison circuit (16, 27) for monitoring of a wheel speed limit, where the two circuit parts (22, 23) are connected to each other via a successively disposed logic circuit (18, 19, 26, 28), 14. The safety circuit according to claim 13, wherein the logic circuit comprises four AND gates (18, 19, 26, 28), which AND gates, in each case, include two inputs, which two inputs are connected to the outputs of the jump-recognition circuits (15, 17, 25, 29) and to the outputs of the comparison circuits (16, 27), wherein the outputs of the jump-recognition circuits (15, 17, 25, 29) and the outputs of the comparison circuits (16, 27) are connected to the inputs of an OR gate (20).

15. The safety circuit according to claim 13, wherein the jump recognition circuits (15, 25, 17, 29) are activated when there occurs an upward jump in velocity from about zero to ±7 km/hour, or when there occurs a downward jump in velocity of more than 11.2 km/hour down to about zero, and when a wheel speed limit is set to 7 km/hour.

16. The safety circuit according to claim 13, wherein the safety circuit (12) includes a microprocessor.

17. The safety circuit according to claim 13, wherein the signal output (30) of the safety circuit (12) is connected to a storage and amplifier circuit (35), which storage and amplifier circuit (35) triggers a signal device such as a lamp (36) and/or a shut-off relay (37, 40) for a respective diagonal formed by two wheels.

18. The safety circuit according to claim 13 wherein the safety circuit includes an integrated circuit.

19. A monitoring method for assuring a proper functioning of an electronic wheel lock-up protected motor vehicle brake system comprising
monitoring a jump in a velocity signal of a first wheel;
monitoring the velocity of a second wheel;
recognizing the jump in the velocity signal of the first wheel as an erroneous signal in a safety circuit;
generating an error signal, where a jump in the velocity signal of one wheel is recognized as an erroneous signal and where simultaneously the velocity of the diagonally, oppositely disposed wheel or of another wheel is found to be at a higher value than a predetermined limiting value;
further comprising detecting an upward jump in a first wheel velocity in a first jump-recognition circuit; detecting a downward jump in a first wheel velocity in a second jump-recognition circuit;
monitoring a wheel speed limit in a comparison circuit; comparing the detecting results and the monitoring results with those of another wheel in a logic circuit.

20. The monitoring method according to claim 19 further comprising amplifying a signal output of the logic circuit in an amplifier circuit; triggering a signal device with an output signal of the amplifier circuit for a respective diagonal formed by two wheels.

21. The monitoring method according to claim 19 further comprising
activating jump recognition circuits when there occurs an upward jump in velocity from about zero to a lower limit value, or when there occurs a downward jump in velocity of more than an upper limit value down to about zero, and when a wheel speed limit is set to the lower limit value.

22. The monitoring method according to claim 19 further comprising
activating jump recognition circuits when there occurs an upward jump in velocity which is sensed by a pick-up transducer disposed near a respective wheel from about zero to a lower limit value, or when there occurs a downward jump in velocity of more than an upper limit value down to about zero, and when a wheel speed limit is set to the lower limit value.

23. The monitoring method according to claim 19 further comprising
partially shutting-off electronic circuitry in a case where a jump in velocity signal of one wheel is recognized as an erroneous signal.

* * * * *